United States Patent
Kim et al.

(10) Patent No.: US 8,121,353 B2
(45) Date of Patent: Feb. 21, 2012

(54) APPARATUS, SYSTEM AND METHOD FOR MAPPING INFORMATION

(75) Inventors: Jay-woo Kim, Seongnam-si (KR); Kee-eung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1029 days.

(21) Appl. No.: 11/584,493

(22) Filed: Oct. 23, 2006

(65) Prior Publication Data

US 2007/0127848 A1  Jun. 7, 2007

(30) Foreign Application Priority Data

Dec. 2, 2005  (KR) .................. 10-2005-0117175

(51) Int. Cl.
*G06K 9/00* (2006.01)
(52) U.S. Cl. .................. 382/113; 701/213; 348/135
(58) Field of Classification Search .................. 382/113; 701/213; 348/135
See application file for complete search history.

(56) References Cited

U.S. PATENT DOCUMENTS

| | | | | |
|---|---|---|---|---|
| 6,950,535 | B2 * | 9/2005 | Sibayama et al. | 382/113 |
| 7,564,377 | B2 * | 7/2009 | Kimchi et al. | 340/995.13 |
| 2005/0234638 | A1 * | 10/2005 | Ogaki et al. | 701/209 |

FOREIGN PATENT DOCUMENTS

| | | |
|---|---|---|
| JP | 10-13720 | 1/1998 |
| JP | 10-274537 | 10/1998 |
| JP | 2002-98548 | 4/2002 |
| JP | 2004-48674 | 2/2004 |
| JP | 2004-78451 | 3/2004 |
| JP | 2004-226170 | 8/2004 |
| JP | 2004-271232 | 9/2004 |
| JP | 2004-334855 | 11/2004 |
| KR | 10-0489890 | 6/2004 |
| KR | 10-2006-0064458 | 6/2006 |

* cited by examiner

*Primary Examiner* — Vikkram Bali
*Assistant Examiner* — Katrina Fujita
(74) *Attorney, Agent, or Firm* — Staas & Halsey LLP

(57) ABSTRACT

An apparatus, system and method for mapping information. The apparatus for mapping information includes an information input unit providing image information and position-view information in a specified area, a three-dimensional model database storing three-dimensional model data of a structure within the specified area and generating a two-dimensional image from the three-dimensional model data using the position-view information, an image processing unit comparing the two-dimensional image with the image information to analyze the image information, a related information acquiring unit acquiring structure related information within the specified area with reference to the analyzed image information, and an information mapping processing unit mapping the structure related information on the image information and outputting a mapping result.

21 Claims, 7 Drawing Sheets

FIG. 5

| | | | |
|---|---|---|---|
| COMPANY INFORMATION | ↩ | EXPORT OF KOREAN FOLKCRAFT ARTICLE (TEL; 02-123-4567) | |
| CLASSIFICATION OF COMPANY | ↩ | TRADING BUSINESS | ↩ |
| COMPANY IN STRUCTURE | ↩ | TRADING COMPANY | ↩ |
| LEFT MESSAGE | FOOD IS NICE | | ↩ |
| STORE INFORMATION | BEVERAGE COUPON AT 18-20 | | ↩ |
| CLASSIFICATION OF STORE | RESTAURANT | ↩ | ↩ |
| STORE IN STRUCTURE | SANTAMARIA | ↩ | ↩ |
| STRUCTURE INFORMATION | BUSINESS BUILDING | BUSINESS BUILDING | HISTORICAL SITE (NATIONAL TREASURE NO. 1) |
| GPS POSITION | (34234.7298) | (34234.7298) | (564.345.32) |
| MAIL ADDRESS | KANGNAM-KU, SEOUL... | KANGNAM-KU, SEOUL... | CHUNG-KU, SEOUL |
| STRUCTURE NAME | KABOOL BUILDING | KABOOL BUILDING | NAMDAEMOON |

<IMAGE INFORMATION OF SPECIFIED AREA>

<TWO-DIMENSIONAL IMAGE GENERATED FROM
THREE-DIMENSIONAL MODEL DB>

APPARATUS, SYSTEM AND METHOD FOR MAPPING INFORMATION

CROSS-REFERENCE TO RELATED APPLICATION

This application is based on and claims priority from Korean Patent Application No. 10-2005-0117175, filed on Dec. 2, 2005, the disclosure of which is incorporated herein by reference.

BACKGROUND OF THE INVENTION

1. Field of the Invention

The present invention relates to an apparatus, system and method for mapping information and, more particularly, to an apparatus, system and method for mapping information, in which a captured image of a specified area is analyzed, structure related information in the specified area is acquired, and the acquired structure related information is mapped on the image.

2. Description of Related Art

A user in an unfamiliar place may desire information relating to surrounding structures. For example, the user may desire to go looking for a store in a target structure by identifying structure related information on the Internet in real time, desire to refer to comments of other users on a corresponding store or description of a structure of a specified historic site, or desire to leave a message. Up to now, the user has acquired desired information through a global positioning system (GPS) and a portable terminal having wireless Internet access. With this system, a map of a specified area is displayed in a portable terminal having wireless Internet access and a GPS, and information of a structure, such as store, company or historic site, which attracts the user's attention, is displayed on the map.

However, if the user wirelessly accesses the Internet to find surrounding information around a current position, various kinds of information of a multistoried building are collectively displayed as many institutes, companies or businesses often exist in a multistoried building. Consequently, information is overlapped and crowded. For this reason, it can be difficult for the user to easily recognize desired specified information.

BRIEF SUMMARY

An aspect of the present invention provides an apparatus, system and method for mapping information, in which a taken image of a specified area is analyzed using a three-dimensional model DB, structure related information in the specified area is acquired in accordance with a user's requirements, and the acquired structure related information is mapped on the image, whereby information relating to the specified area can be transmitted to the user.

In order to accomplish these objects, there is provided an apparatus for mapping information, according to the present invention, which includes: an information input unit providing image information and position-view information in a specified area, a three-dimensional model database (DB) storing three-dimensional model data of a structure within the specified area and generating a two-dimensional image from the three-dimensional model data using the position-view information, an image processing unit comparing the two-dimensional image with the image information to analyze the image information, a related information acquiring unit acquiring structure related information within the specified area with reference to the analyzed image information, and an information mapping processing unit mapping the structure related information on the image information and outputting a mapping result.

In another aspect of the present invention, there is provided a system for mapping information, which includes: a portable terminal having an information input unit that provides image information and position-view information in a specified area; a three-dimensional model database storing three-dimensional model data of a structure within the specified area and generating a two-dimensional image from the three-dimensional model data using the position-view information; and a server having an image processing unit that compares the two-dimensional image with the image information to analyze the image information, a related information acquiring unit acquiring structure related information within the specified area with reference to the analyzed image information, and an information mapping processing unit mapping the structure related information on the image information and outputting a mapping result, wherein the portable terminal displays the result.

In still another aspect of the present invention, there is provided a method of mapping information, which includes: providing image information and position-view information of a specified area, and providing a two-dimensional image of three-dimensional model data of a structure within the specified area from a three-dimensional DB that stores the three-dimensional model data; comparing the two-dimensional image with the image information to analyze the image information; acquiring structure related information with reference to the analyzed image information; and mapping the structure related information on the image information and outputting a mapping result.

In yet another aspect of the present invention, there is provided a computer readable recording medium encoded with processing instructions for causing a processor to execute the aforementioned method.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 5 is a view illustrating structure related information acquired by a related information acquiring unit of an apparatus for mapping information according to the embodiment of the present invention;

DETAILED DESCRIPTION OF EMBODIMENTS

Figure 1:
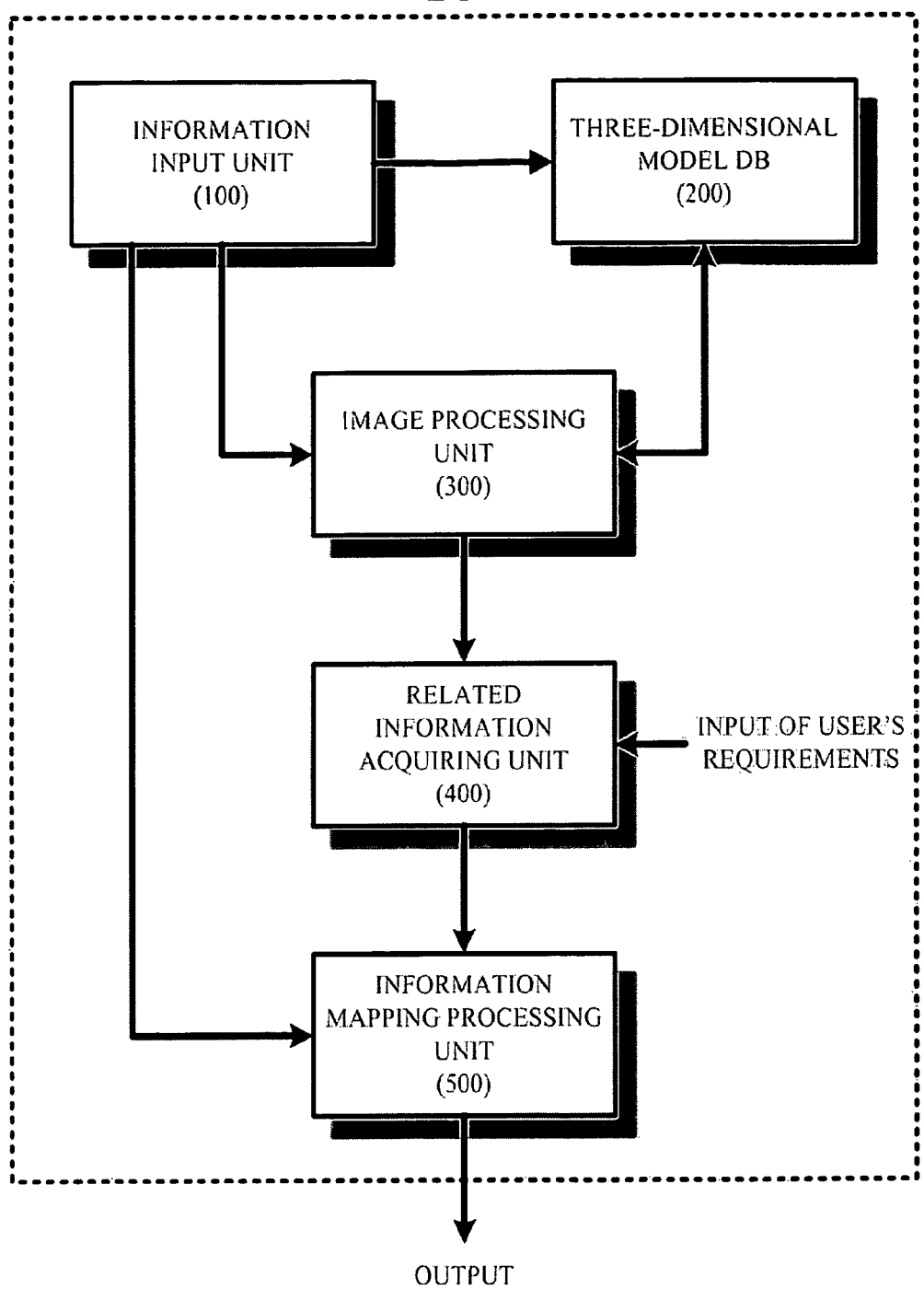
FIG. 1 is a block diagram illustrating an apparatus for mapping information according to the embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an apparatus for mapping information according to the embodiment of the present invention.

Referring to FIG. 1, the apparatus includes an information input unit 100, a three-dimensional model database (DB) 200, an image processing unit 300, a related information acquiring unit 400, and an information mapping processing unit 500.

The information input unit 100 provides image information and position-view information to the image processing unit 300 or the three-dimensional model database (DB) 200. The image information is for an image of a current specified area where a user is located, captured by an imaging device such as, by way of a non-limiting example, a camera, and the position-view information is for the current position where the user is located, received through various sensors. In the description that follows, the information input unit 100 uses, as an example, a camera that takes a picture of the current specified area to detect image information. The information input unit 100 receives the position-view information through various sensors. The position information of the camera is detected through a GPS receiver, directional information of the camera directed to take the image is detected through a geomagnetic sensor, angle information of the camera with respect to a horizontal plane is detected through a gyro sensor, and altitude information of the camera is detected through an altitude sensor.

The information input unit 100 may include all the aforementioned sensors. However, it is to be understood that fewer sensors may be provided. Sensors can generate noise. In this case, correction is needed using a correction algorithm. In general, distribution of the current actual value is inferred from a previous measured value using a dynamic Bayesian network algorithm to detect the various kinds of information as above. Since the dynamic Bayesian network algorithm is known, further detailed description will be omitted. The position-view information of the place where the user is located can be detected from the information detected using the above sensors or the algorithm.

The information input unit 100 calculates coordinate information (X, Y, Z) on a whole coordinate system of the camera and coordinate information (U, V, W) on a local coordinate system of the camera using the position information, the directional information, the angle information, and the altitude information detected as described above. Also, the information input unit 100 detects the position-view information from the coordinate information and provides the detected position-view information to the image processing unit 300 along with the detected image information of the specified area. At this time, the image processing unit 300 provides the position-view information among the information from the information input unit 100 to the three-dimensional model DB 200. Alternatively, the information input unit 100 may directly provide the position-view information to the three-dimensional model DB 200 without going through the image processing unit 300.

The three-dimensional model data DB 200 generates a two-dimensional image from three-dimensional model data using the position-view information provided from the image processing unit 300 or the information input unit 100. The position-view information corresponds to coordinate information on the whole coordinate system and the local coordinate system. The three-dimensional model data DB 200 again transmits the generated two-dimensional image to the image processing unit 300. The three-dimensional model data DB 200, which stores three-dimensional model data of a structure existing in the specified area, may be referred to as a set of three-dimensional models of various buildings, road, historic sites, or trees, which are previously obtained. The three-dimensional model data include attribute information including GPS information, a mail address and a structure name of a structure such as a building or a road, and are comprised of data in which real images of the structure are texture mapped.

In order to generate the two-dimensional image from the three-dimensional model data, the three-dimensional model DB 200 uses perspective projection. Perspective projection is a type of rendering that approximates a three dimensional view in two dimensions so as to approximate real-world visual perception. The perspective projection considers a relative size of an object at the center of view enlarged through a screen using a viewpoint as the peak. The perspective projection enables expression of a far and near range, and its examples include Z-buffer projection and ray tracing projection.

Figure 6A:
FIGS. 6A and 6B are views illustrating an analyzing operation of comparing image information of a specified area with a two-dimensional image using an image processing unit of an apparatus for mapping information according to the embodiment of the present invention.
Figure 6B:
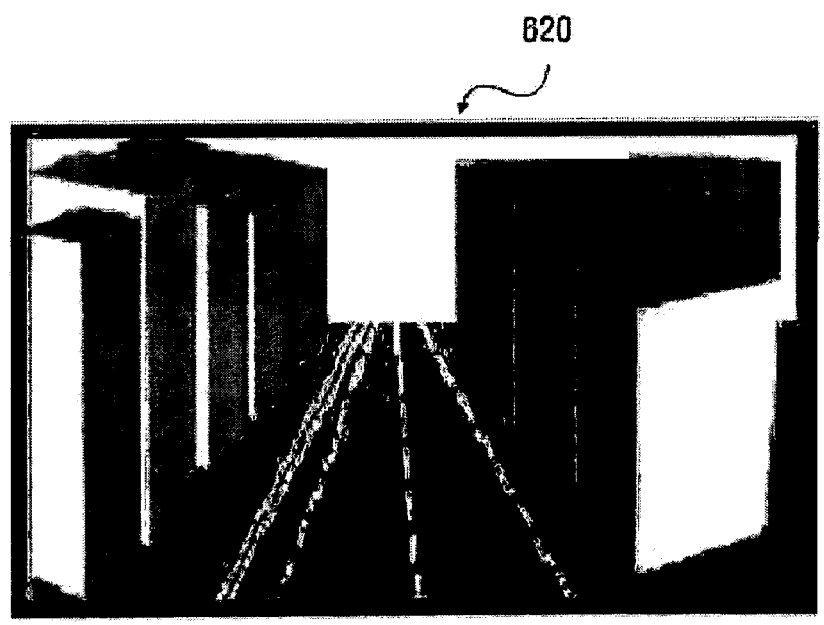

The image processing unit 300 compares the two-dimensional image of the three-dimensional model data provided from the three-dimensional model DB 200 with the image information of the specified area to analyze the image information. The process of comparing the two-dimensional image with the image information of the specified area is shown in FIGS. 6A and 6B. That is, FIGS. 6A and 6B show an example of the process of comparing and analyzing the image information 610 (FIG. 6A) with the two-dimensional image 620 (FIG. 6B) through the image processing unit 300 according to the present embodiment. The image processing unit 300 compares the two-dimensional image 620 of FIG. 6B with the image information 610 of FIG. 6A of the specified area provided from the information input unit 100 through image analysis to identify what structures in the image information 610 are. The image processing unit 300 divides the specified area in the image information 610 around the structure and maps attribute information of the structure per partitioned area. As described above, the attribute information means information including "GPS information," "mail address" and "structure name" of a structure such as a building or a road within the specified area.

For the image analysis, a pattern matching method is mainly used. According to the pattern matching method, after both the image information 610 taken by the user and the two-dimensional image 620 provided from the three-dimensional model DB 200 undergo edge detection, they undergo mutual pattern matching. An example of the pattern matching method includes a minimum feature distance comparison method.

The related information acquiring unit 400 acquires structure related information within the specified area with reference to the image information 610 of the specified area analyzed by the image processing unit 300. The structure related information includes recognition information on Internet or information left from Internet users relating to the structure, or a main element, such as a store, a company or a restaurant, existing in the structure. If the user inputs requirements relating to the structure related information through a menu selection means or a text input means, the related information acquiring unit 400 can acquire the structure related information from the Internet using a search engine for information retrieval.

The structure related information is shown in FIG. 5 which exemplarily shows the structure related information acquired by the related information acquiring unit 400 of FIG. 1 according to the present embodiment. Referring to FIG. 5, "structure name," "mail address" and "GPS position information" are provided as the attribute information of the structure such as "Kabool building" and "Namdaemoon" by the image analysis of the image processing unit 300 of FIG. 1. The structure related information such as "store in the structure," "store information," "left message" and "company in the structure" can be acquired by the related information acquiring unit 400 of FIG. 1.

Figure 7:
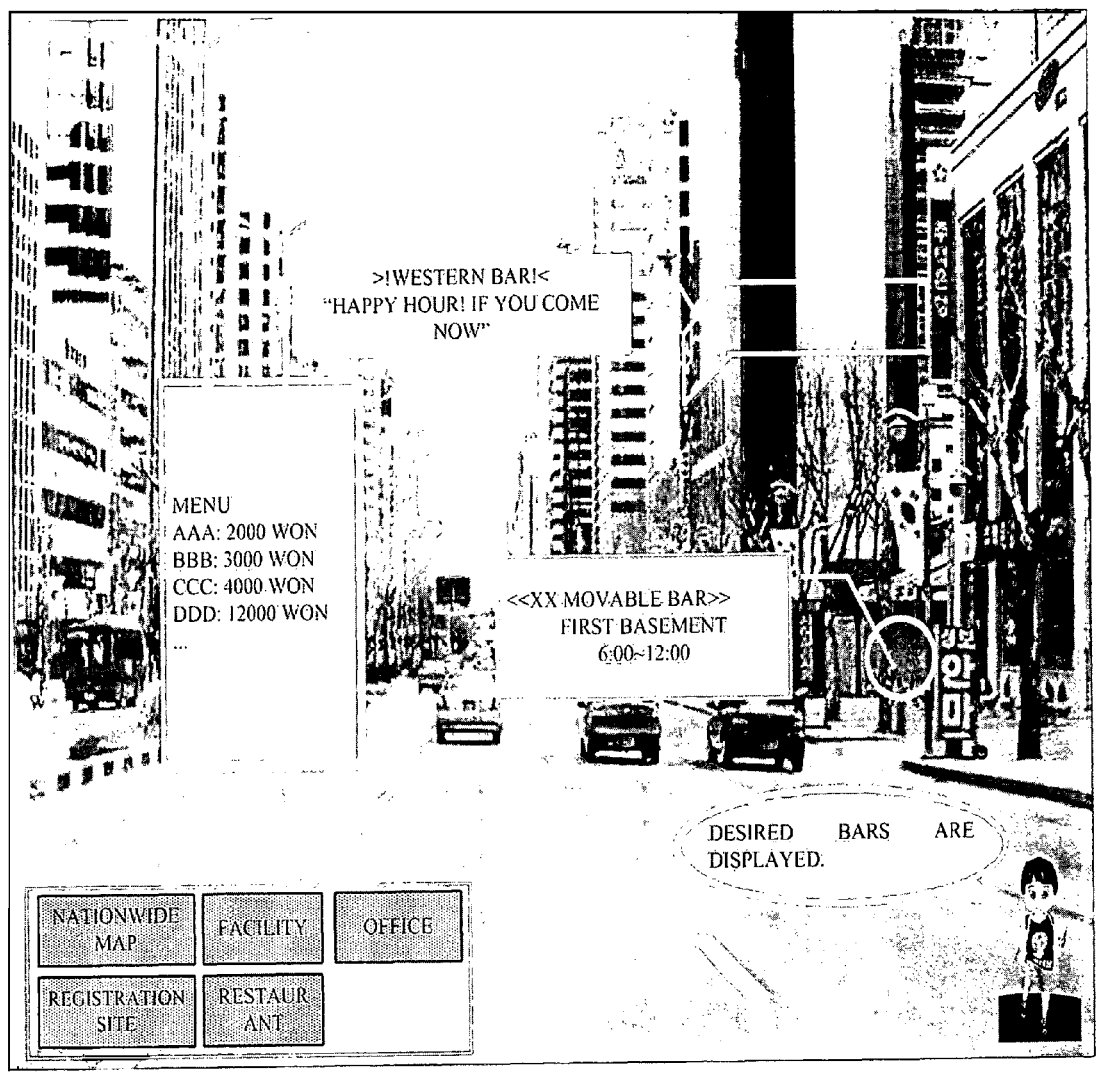
FIG. 7 is a view illustrating a resultant image output from an information mapping processing unit of an apparatus for mapping information according to the embodiment of the present invention.

The information mapping processing unit 500 of FIG. 1 maps the acquired structure related information on the image information 610 of FIG. 6A and output the result of mapping as shown in FIG. 7. FIG. 7 shows an example of a resultant image output from the information mapping processing unit 500 of FIG. 1 according to the embodiment of the present invention. Referring to FIG. 7, the structure related information such as menu information of restaurant, its hours of operation, and its pricing information is mapped on the image information 620 of FIG. 6B captured by the user. For example, if the user requests Thai restaurant related information, the Thai restaurant related information is displayed on a building area where a specific Thai restaurant exists.

Also, if the user requests specific handling such as a mobile coupon or desires to directly visit a related homepage, or if the user desires to retrieve messages left on the homepage from previous users or directly leave a message on the homepage, Internet homepage address information obtained from the related information acquiring unit 400 is mapped on the image of FIG. 7. Thus, the user can access the homepage of the Thai restaurant using the homepage address.

It has been described thus far that a retrieval (search) engine is sent to the Internet only if all the elements of the apparatus for mapping information are provided in a portable terminal and the structure related information is retrieved by the related information acquiring unit 400 of FIG. 1. However, the information input unit 100 of FIG. 1 may separately be provided as the portable terminal, and the image processing unit 300 of FIG. 1, the related information acquiring unit 400 and the information mapping processing unit 500 of FIG. 1 may be provided in a separate server, as shown in FIG. 2.

Figure 2:
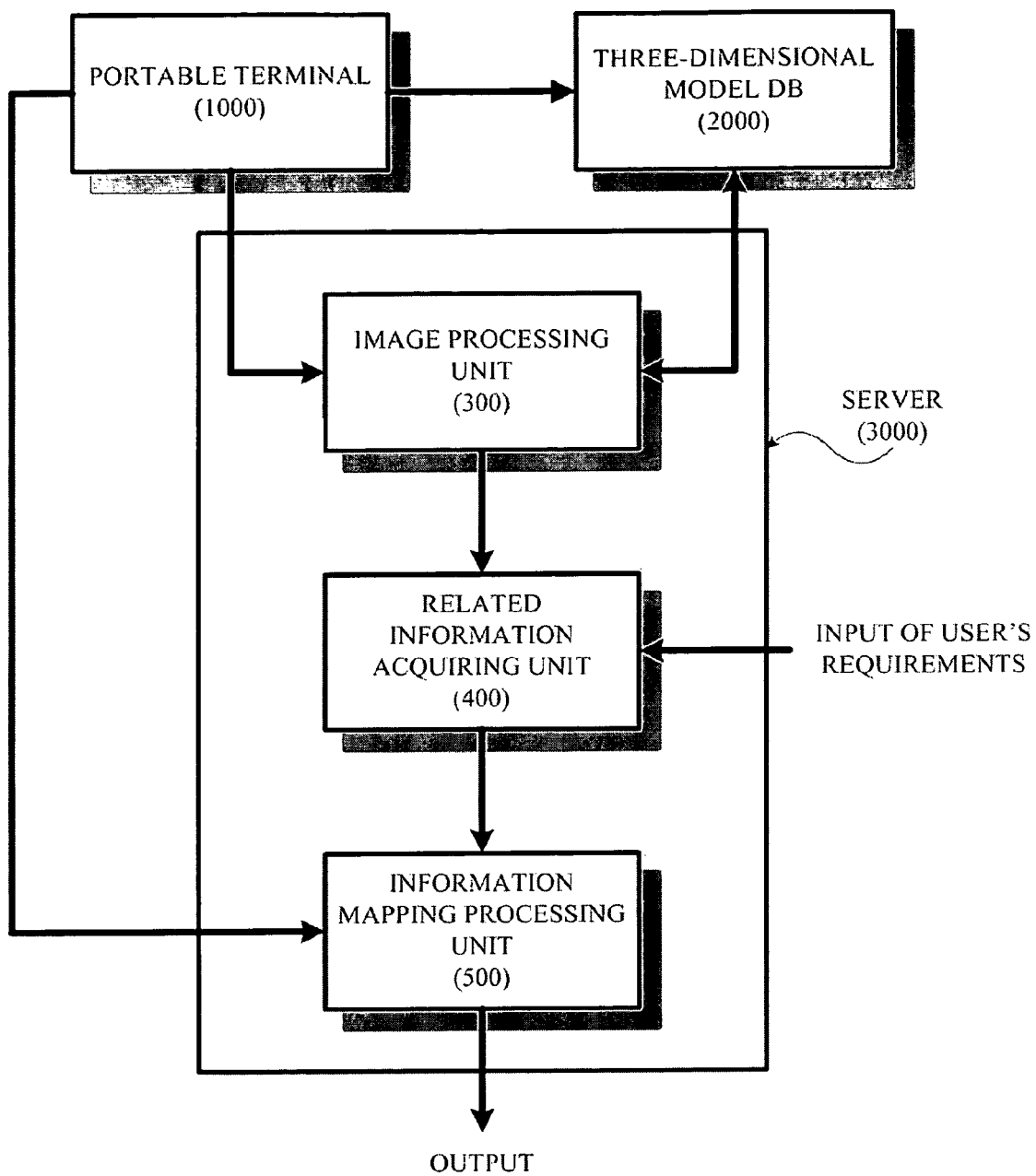
FIG. 2 is a block diagram illustrating a system for mapping information according to the embodiment of the present invention.

FIG. 2 is a block diagram illustrating a system for mapping information according to the embodiment of the present invention.

Referring to FIG. 2, the system includes a portable terminal 1000, a three-dimensional model DB 2000, and a server 3000. The portable terminal 1000 provides image information and position-view information of a specified area. The portable terminal 1000 performs the same function as that of the information input unit 100 of FIG. 1.

The three-dimensional model DB 2000 stores three-dimensional model data of a structure within the specified area. Since the three-dimensional model DB 2000 also performs the same function as that of the three-dimensional model DB 200 of FIG. 1, further detailed description thereof will be omitted.

The server 3000 includes an image processing unit 300, a related information acquiring unit 400, and an information mapping processing unit 500. The image processing unit 300 compares the two-dimensional image of the three-dimensional model data provided from the three-dimensional model DB 2000 with image information provided from the information input unit 100 in the portable terminal 1000 to analyze the image information. The related information acquiring unit 400 acquires structure related information relating to a structure within the specified area with reference to the image information analyzed by the image processing unit 300.

The information mapping processing unit 500 maps the structure related information acquired by the related information acquiring unit 400 on the image information provided from the information input unit 100 of FIG. 1 and transmits the result of the mapping to the portable terminal 1000 of FIG. 2. The portable terminal 1000 displays the resultant image transmitted from the information mapping processing unit 500. Since the system of FIG. 2 is the same as that of FIG. 1, except that the system includes the portable terminal 1000, the server 3000 and the three-dimensional model DB 2000, further detailed explanation thereof will be omitted.

In the described embodiments of the present invention, the term "unit", that is, "module" or "table", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more central processing units (CPUs) in a device.

Figure 3:
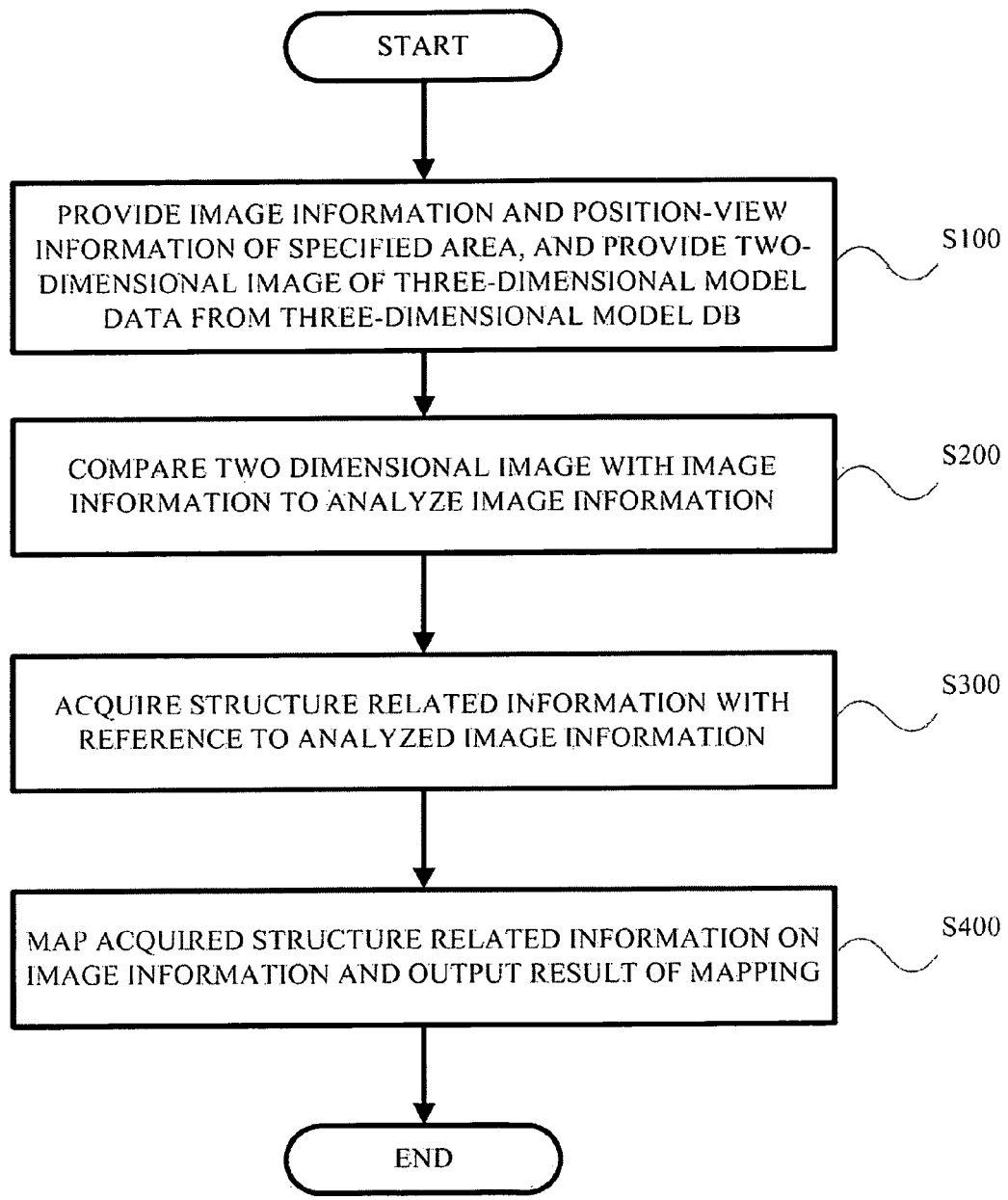
FIG. 3 is a flowchart illustrating a method of mapping information according to the embodiment of the present invention.
Figure 4:
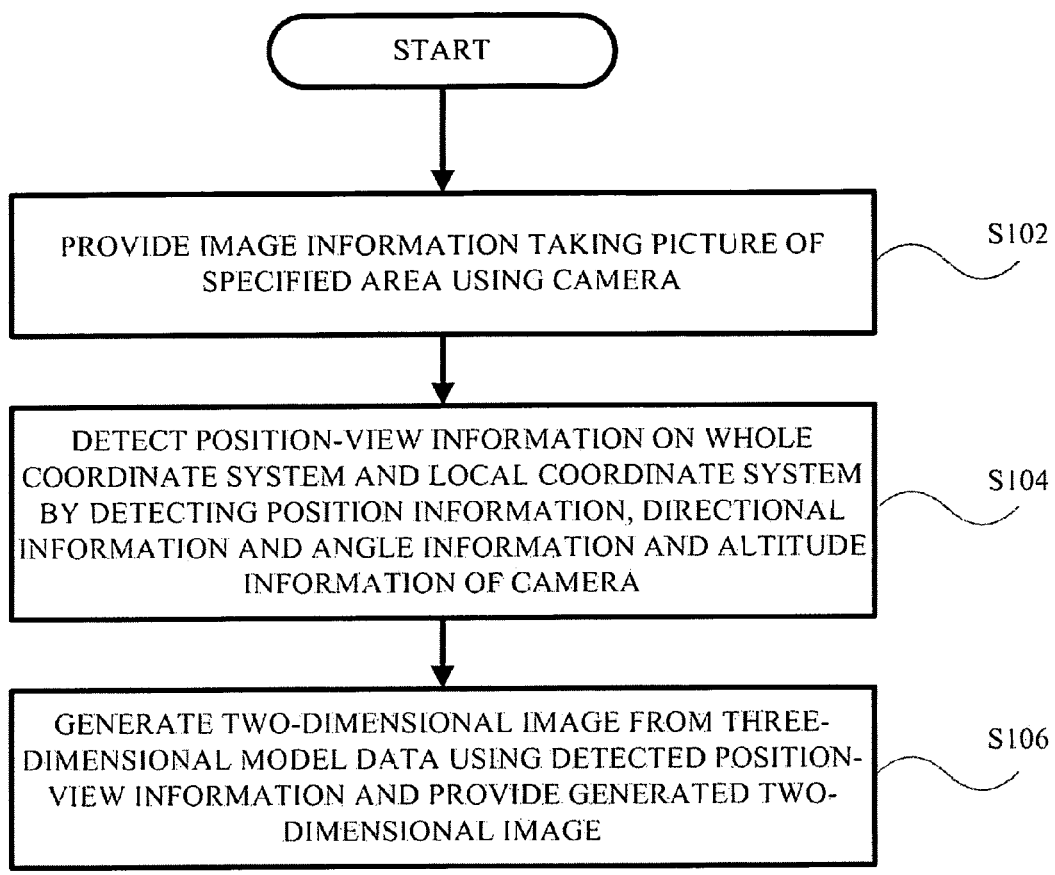
FIG. 4 is a flowchart illustrating an operation of providing image information and position-view information and a two-dimensional image in a method of mapping information according to the embodiment of the present invention.

A flow of a method of mapping information will now be described with reference to FIGS. 3 and 4. FIG. 3 is a flowchart illustrating the method of mapping information according to the embodiment of the present invention, and FIG. 4 is a flowchart illustrating an operation of providing image and position-view information and a two-dimensional image in the method of mapping information according to the embodiment of the present invention. This method is described with concurrent reference to the apparatus of FIG. 1 and the system of FIG. 2 for ease of explanation only.

Referring to FIGS. 1-4, 6A and 6B, first, image information and position-view information of the specified area are provided, and the two-dimensional image of the three-dimensional model data is provided from the three-dimensional model DB that stores the three-dimensional model data of the structure within the specified area, in operation S100. This operation S100 will be described in detail with reference to FIG. 4.

In operation S102, the camera takes an image of the specified area where the user is located, and the portable terminal 1000 or the information input unit 100 of the portable terminal 1000 provides the image information 610 taken by the camera to the image processing unit 300. The portable terminal 1000 or the information input unit 100 of the portable terminal 1000 detects position-view information on the whole coordinate system and the local coordinate system of the camera by detecting position information of the camera using the GPS receiver, detecting directional information of the camera directed to take the image using the geomagnetic sensor, detecting angle information of the camera to the horizontal plane using the gyro sensor, and detecting altitude information of the camera using the altitude sensor, in operation S104.

The detected position-view information is transmitted to the three-dimensional model DB 200 or 2000, and the three-dimensional model DB 200 or 2000 generates the two-dimensional image 620 from the three-dimensional model data using the position-view information and provides the generated two-dimensional image 620 to the image processing unit 300, in operation S106. The three-dimensional model data include attribute information such as GPS information of the structure, mail address and structure name, and are comprised of data in which real images of the structure are texture mapped.

The image processing unit 300 compares the two-dimensional image 620 with the image information 610 of the specified area to analyze the image information 610 of the specified area, in operation S200. The image processing unit 300 may compare the two-dimensional image 620 with the image information 610 of the specified area using the image analysis. As a result, the image processing unit 300 divides the specified area around the structure and maps the attribute information of the structure per divided area to perform operation S200 for analyzing the image information.

The related information acquiring unit 400 acquires the structure related information within the specified area with reference to the analyzed image information, in operation S300. The related information acquiring unit 400 may acquire the structure related information from Internet using a search engine for information retrieval through a menu selection means or a text input means. The structure related information includes recognition information from the Internet or information left from Internet users relating to the structure, or a main element existing in the structure.

Finally, the information mapping processing unit 500 maps the acquired structure related information on the image information to output the result of mapping, in operation S400.

It is to be appreciated that embodiments of the present invention include a computer readable recording medium encoded with a program code for executing the aforementioned method in a computer.

As described above, in the apparatus, system and method for mapping information according to the above-described embodiments of the present invention, the structure related information within the specified area where the user is located is acquired in accordance with the user's requirements and the acquired structure related information is mapped on the image taken by the user, whereby the information related to the specified area can be provided to the user.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for mapping information, comprising:
an information input unit to provide image information and position-view information of a specified area;
a three-dimensional model database to store three-dimensional model data of a structure within the specified area and to generate a two-dimensional image from the three-dimensional model data using the position-view information;
an image processing unit to compare the two-dimensional image with the image information to analyze the image information;
a related information acquiring unit to acquire structure related information within the specified area with reference to the analyzed image information; and
an information mapping processing unit to map the structure related information on the image information and to output a mapping result,
wherein the three-dimensional model data include attribute information,
wherein the image processing unit compares the two-dimensional image with the image information provided from the information input unit by dividing the specified area around the structure and mapping the attribute information of the structure per divided area, thereby analyzing the image information, and
wherein the structure related information includes recognition information on Internet or information left from Internet users relating to the structure, or a main element in the structure, and the structure related information is drawn 2-dimensionally on the image information.

2. The apparatus of claim 1, wherein the information input unit includes:
a camera to capture an image of the specified area to detect the image information; and
a sensor to detect the position-view information on a whole coordinate system and a local coordinate system of the camera,
wherein the information input unit provides the detected image information and the detected position-view information to the image processing unit.

3. The apparatus of claim 2, wherein the sensor includes at least one of a global positioning system (GPS) receiver to detect position information of the camera, a geomagnetic sensor to detect directional information of the camera, a gyro sensor to detect angle information of the camera with respect to a horizontal plane, and an altitude sensor to detect altitude information of the camera.

4. The apparatus of claim 3, wherein the attribute information includes GPS information of the structure, a mail address and a structure name, and are comprised of data in which real images of the structure are texture mapped.

5. The apparatus of claim 4, wherein the three-dimensional model data base receives position-view information from the image processing unit or the information input unit.

6. The apparatus of claim 5, wherein the three-dimensional model database generates the two-dimensional image from the three-dimensional model data using perspective projection.

7. The apparatus of claim 5, wherein the related information acquiring unit acquires the structure related information through a menu selection or input text.

8. The apparatus of claim 7, wherein the related information acquiring unit acquires the structure related information from the Internet using a search engine for information retrieval.

9. A system for mapping information, comprising:
a portable terminal including an information input unit that provides image information and position-view information in a specified area;

a three-dimensional model database to store three-dimensional model data of a structure within the specified area and to generate a two-dimensional image from the three-dimensional model data using the position-view information; and a server which includes an image processing unit that compares the two-dimensional image with the image information to analyze the image information, a related information acquiring unit to acquire structure related information within the specified area with reference to the analyzed image information, and an information mapping processing unit to map the structure related information on the image information and outputting a mapping result, wherein the portable terminal displays the mapping result, wherein the three-dimensional model data include attribute information, wherein the image processing unit compares the two-dimensional image with the image information provided from the information input unit by dividing the specified area around the structure and mapping the attribute information of the structure per divided area, thereby analyzing the image information, and wherein the structure related information includes recognition information on Internet or information left from Internet users relating to the structure, or a main element in the structure, and the structure related information is drawn 2-dimensionally on the image information.

10. The system of claim 9, wherein the information input unit includes:

a camera to capture an image of the specified area to detect the image information; and a sensor to detect the position-view information on a whole coordinate system and a local coordinate system of the camera;

wherein the information input unit provides the detected image information and the detected position-view information to the image processing unit.

11. The system of claim 10, wherein the sensor includes at least one of a global positioning system (GPS) receiver to detect position information of the camera, a geomagnetic sensor to detect directional information of the camera, a gyro sensor to detect angle information of the camera with respect to a horizontal plane, and an altitude sensor to detect altitude information of the camera.

12. The system of claim 11, wherein the attribute information includes GPS information of the structure, a mail address and a structure name, and are comprised of data in which real images of the structure are texture mapped.

13. The system of claim 12, wherein the three-dimensional model data base receives position-view information from the image processing unit or the information input unit.

14. The system of claim 13, wherein the three-dimensional model database generates the two-dimensional image from the three-dimensional model data using perspective projection.

15. The system of claim 13, wherein the related information acquiring unit acquires the structure related information through a menu selection or input text.

16. The system of claim 15, wherein the related information acquiring unit acquires the structure related information on the Internet using a search engine for information retrieval.

17. A method of mapping information, comprising:

providing image information and position-view information of a specified area, and providing a two-dimensional image of three-dimensional model data of a structure within the specified area from a three-dimensional database that stores the three-dimensional model data;

comparing the two-dimensional image with the image information to analyze the image information;

acquiring structure related information with reference to the analyzed image information; and mapping the structure related information on the image information and outputting a mapping result using at least one processor, wherein the three-dimensional model data includes attribute information;

wherein the comparing the two-dimensional image with the image information includes dividing the specified area around the structure, and mapping the attribute information of the structure per divided area, thereby analyzing the image information; and wherein the structure related information includes recognition information on Internet or information left from Internet users relating to the structure, or a main element in the structure, and the structure related information is drawn 2-dimensionally on the image information.

18. The method of claim 17, wherein the providing includes:

capturing an image of the specified area using a camera to detect the image information;

detecting the position-view information on a whole coordinate system and a local coordinate system of the camera by detecting position information of the camera using a GPS receiver, detecting directional information of the camera, detecting angle information of the camera with respect to a horizontal plane, and detecting altitude information of the camera; and generating the two-dimensional image from the three-dimensional model data using the detected position-view information and providing the generated two-dimensional image.

19. The method of claim 18, wherein the attribute information includes global positioning system (GPS) information of the structure, a mail address and a structure name, and are comprised of data in which real images of the structure are texture mapped.

20. The method of claim 18, wherein the acquiring includes acquiring the structure related information through a menu selection or input text using a search engine for information retrieval.

21. A non-transitory computer readable recording medium recorded with a program code for causing a processor to execute the method of claim 17.

* * * * *

UNITED STATES PATENT AND TRADEMARK OFFICE
CERTIFICATE OF CORRECTION

| | | |
|---|---|---|
| PATENT NO. | : 8,121,353 B2 | Page 1 of 1 |
| APPLICATION NO. | : 11/584493 | |
| DATED | : February 21, 2012 | |
| INVENTOR(S) | : Jay-woo Kim et al. | |

It is certified that error appears in the above-identified patent and that said Letters Patent is hereby corrected as shown below:

Column 8, Line 51, In Claim 5, delete "data base" and insert -- database --, therefor.

Column 9, Line 51, In Claim 13, delete "data base" and insert -- database --, therefor.

Signed and Sealed this
Twenty-ninth Day of May, 2012

David J. Kappos
*Director of the United States Patent and Trademark Office*